Oct. 13, 1942.　　　D. B. BAKER　　　2,298,450
SEAT
Filed Dec. 23, 1939
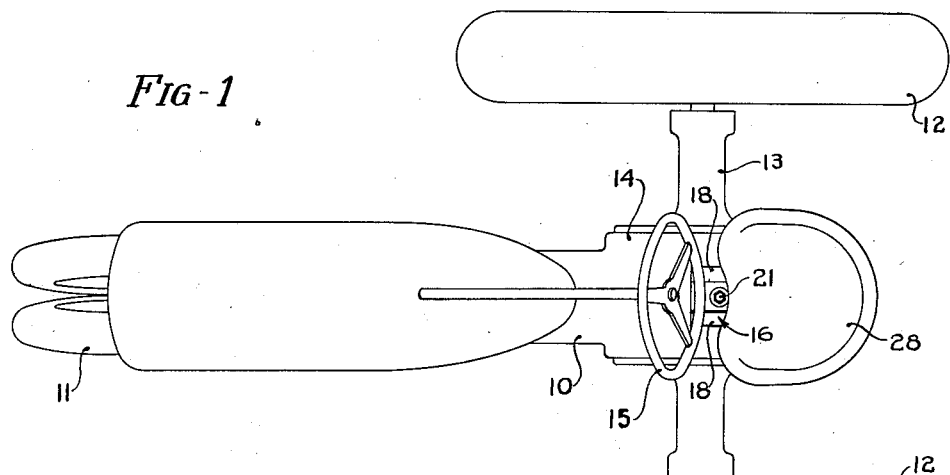
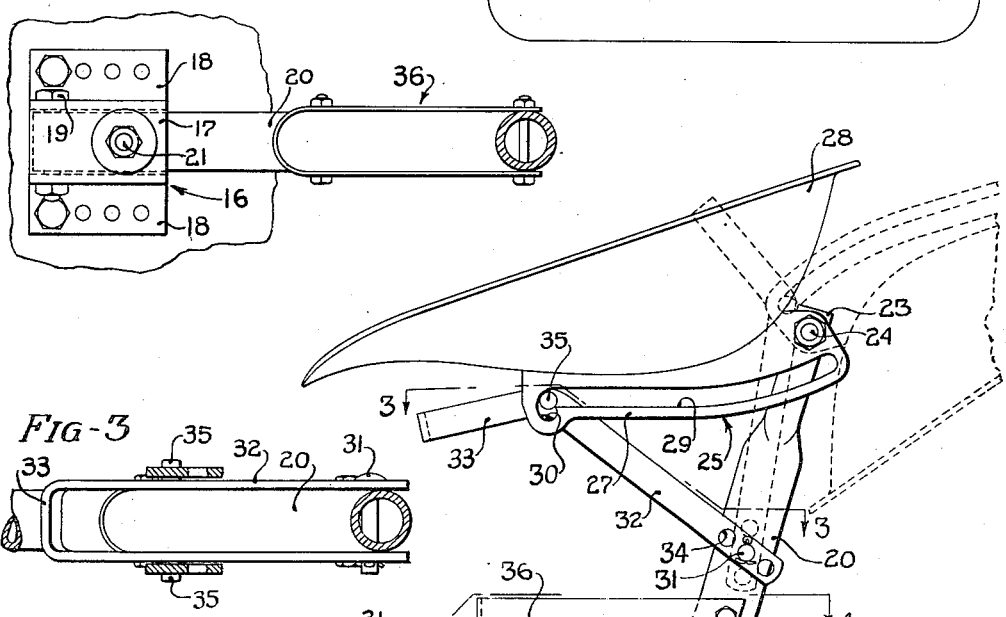
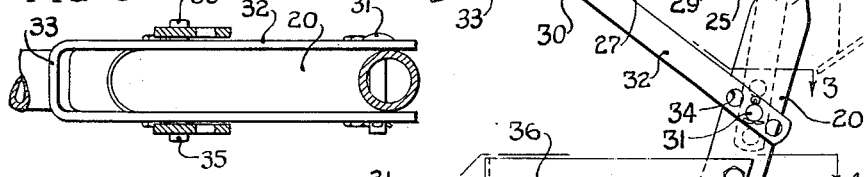
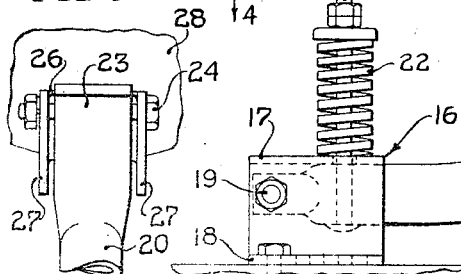
INVENTOR
DAVID B. BAKER
BY Paul O. Pippel
ATT'Y.

Patented Oct. 13, 1942

2,298,450

UNITED STATES PATENT OFFICE 2,298,450

SEAT

David B. Baker, Riverside, Ill., assignor to International Harvester Company, a corporation of New Jersey Application December 23, 1939, Serial No. 310,718

2 Claims. (Cl. 155—51)

This invention relates to a seat construction and especially to such a construction for a vehicle.

The invention is particularly adapted for use on a tractor of the agricultural type. Such tractors consist generally of a longitudinal, narrow body supported at its rear end on large drive wheels and at its front end on steerable front wheels, the steering wheel for which is located at the rear of the tractor substantially centrally of the rear axle housing. The rear body part of the tractor provides an operator's station which includes a seat arranged conveniently near the steering wheel and other control members of the tractor.

The ordinary seat satisfactorily accommodates a seated operator, but it is often desirable that the operator be able to stand at the station to operate the tractor, and in such standing position, the normal disposition of the seat interferes with the operator. Accordingly, the present invention provides a seat which may be tilted away from its normal position so that the operator's station will comfortably accommodate a standing operator at the tractor controls.

The principal object of the invention is to provide an improved seat construction in which the seat is tiltable from a normal, generally horizontal position to a raised or tilted position.

Another important object is to provide means for supporting the seat in horizontal position, said means serving also to limit tilting movement of the seat.

Another important object is to provide locking means for preventing accidental tilting of the seat.

Another object is to provide such locking means in the form of a releasable lock having a handle portion readily accessible to the tractor operator.

These and other important objects may be achieved in one preferred form of the invention in which the rear body portion of the tractor is provided with an upstanding support carrying at its upper end a tiltable seat. The seat is provided with a pair of spaced abutments and the support carries a brace member which engages one of the abutments to support the seat in normal position and which engages the other abutment to support the seat in tilted position. The first abutment includes means providing part of a safety latch means for preventing accidental tilting of the seat, said means being readily accessible to and operable by the operator to tilt the seat when necessary.

A more complete understanding of these and other desirable objects and features may be had from the following detailed description taken in conjunction with the accompanying sheet of drawings, in which:

Figure 1 is a plan view of one form of vehicle in which the seat construction may be utilized;

Figure 2 is an enlarged elevational view of the seat construction;

Figure 3 is a transverse sectional view taken substantially along the line 3—3 of Figure 2;

Figure 4 is a transverse sectional view taken along the line 4—4 of Figure 2; and, Figure 5 is a detailed view of the seat carrying member as arranged with respect to the seat support.

The vehicle chosen for the purpose of illustration is a tractor of the agricultural type comprising generally a main body 10 supported on a front steerable truck 11 and by rear drive wheels 12 carried at opposite ends of a transverse axle housing structure 13. The rear portion of the body intermediate the ends of the axle housing structure provides an operator's platform 14. A steering wheel 15 is suitably connected to the steering mechanism to steer the front wheels 11.

The improved seat construction is carried at the operator's station at the rear part of the body 10. The body at this point carries a bracket 16 in the form of an inverted U, having an upper horizontal portion 17 and a pair of lower horizontal flanges 18. These flanges are suitably secured to the upper portion of the rear body part. The opposite side walls of the bracket 16 are bored to receive a transverse pin 19, which pin serves pivotally to carry a rearwardly curving seat support 20, preferably formed tubular in cross section. A vertically disposed bolt 21 extends upwardly through a forward portion of the support 20, through an opening in the upper portion 17 of the bracket 16, and through a coil spring 22. The support 20 is thus resiliently supported by the bracket 16. The upper end of the support 20 is flattened diametrically to provide a wider portion 23. This portion receives on a transverse axis therethrough a pivot pin 24 for supporting the seat, as will be presently described.

The pivot pin 24 carries for pivotal movement thereabout a seat-carrying member 25 formed generally as an inverted channel having an upper, generally horizontal portion 26 and opposite, vertical side wall portions 27. The channel 25 extends longitudinally of the tractor and forwardly of the pivot 24. A seat 28 is rigidly secured to the upper portion 26 of the channel 25.

Each side wall portion 27 of the channel 25 is formed with an elongated slot 29 extending substantially throughout the wall 27 from a point adjacent the pin 24 to a point substantially forwardly thereof. The forward portion of the slot joins a notch 30 cut out of the side wall 27. In other words, the slot 29 is substantially an L having an elongated horizontal leg and a considerably shorter, downwardly directed, vertical leg. The slots and notches of the side walls are, of course, alined.

The tubular support 20 carries a second transverse pin 31 providing a pivot for connecting one end of a brace member 32. This brace member is generally in the form of a bail extending upwardly and forwardly toward the front portion of the channel 25 and then forwardly beyond the channel 25 to a point within proximity to the forward edge of the seat. This bail portion provides a handle 33 for purposes presently to appear. The free ends of the bail or brace, as aforesaid, are connected to the support 20, and the legs of the bail at this point are provided with a plurality of openings 34, each adapted to fit the pin 31 for adjustment of the bail or brace member 32.

An intermediate portion of the bail or brace 32 is provided with a pair of laterally extending members 35, these members respectively engaging and being guided in the slots 29 in the walls 27 of the channel 25. As best shown in Figure 2, when the seat is disposed in horizontal position, the members 35 on the brace member 33 engage the channel walls 27 at the forward ends of the slots 29. The wall portions at these points provide an abutment against which the members 35 bear so that the brace member 31 supports the seat in normal position to carry a seated operator on the tractor. The broken line position of the seat in Figure 2 illustrates the position taken by the seat when tilted upwardly and rearwardly about the pivot pin 24. The members 35 on the brace member 32 follow the slots 29, which are curved to accommodate and guide them, until the opposite ends of the slots are reached, whereat the wall portions at these points provide a second abutment against which the members 35 bear to limit further rearward tilting movement of the seat. The seat may be readily returned to normal position, the members 35 following the slots 29 until the position shown in full lines is reached.

An important feature of the invention is the provision of a safety means which prevents accidental rearward tilting of the seat. This means is provided by cooperation between the notches 30 in the channel walls 27 and the members 35 on the brace member 32. As previously stated, when the seat is in normal position, the members 35 bear against the abutments provided by the forward wall portions at the forward ends of the slots 29. Should the seat become disposed to tilt rearwardly when not desired, the members 35 will drop into the notches 30 and thus prevent further upward movement of the seat. When the operator desires to tilt the seat rearwardly, he lifts the brace member 32 upwardly through the medium of the handle portion 33 in order to prevent the members 35 from becoming engaged with the notches 30. As otherwise stated, the brace member 32 may be retained in the position shown in Figure 2 by the operator's holding the brace member 32 upwardly just prior to tilting the seat rearwardly.

The support 20 is further adapted to carry a tool box 36, preferably formed of sheet metal and fitted at the bend or curve of the support.

From the foregoing description it will be seen that an improved tiltable seat is provided for a vehicle. It will be seen that the seat 28 may be quickly and easily tilted rearwardly away from the steering wheel 15 to accommodate a standing operator astride the horizontal portion of the support 20. The operator may thus assume a position from which he may easily operate the tractor without experiencing the usual interference with the front portion of the seat. When the seat is in normal position, it easily and comfortably supports the operator, and accidental rearward tipping is prevented by the safety means previously described.

It will be understood, of course, that only a preferred embodiment of the invention has been illustrated, and this in connection with only one form of vehicle. It will therefore be appreciated that numerous modifications and alterations may be made in the construction illustrated without departing from the spirit and scope of the invention as defined in the appended claims.

What is claimed is:

1. A seat construction comprising an upright tubular support having its upper end flattened diametrically to provide a wider portion, a generally horizontally extending inverted channel having vertical side portions embracing and pivoted for tilting at one end to the support on a horizontal axis passing through said wider portion, each side portion of the channel including an elongated guide slot therein having a downwardly directed notch, said slots and notches being alined, a seat carried on the channel, and a brace in the form of a bail having its legs at its open end embracing and pivoted to the support below the first pivot and extending between the sides of the channel and having its closed end disposed beyond said channel to provide a handle portion near one edge of the seat, said bail having guide members respectively slidably engaging the slots in the channel side portions, said members engaging the channel at one end of the slots to support the seat in substantially horizontal position and at the other end of the slots to support the seat in tilted position, said members on the bail respectively engaging the aforesaid notches upon slight upward movement of the seat to prevent accidental tilting of the seat, said handle portion on the bail providing means for releasing the members from the notches for permitting tilting of the seat.

2. A seat construction comprising an upright support, a generally horizontally extending inverted channel having vertical side portions embracing the support and pivoted thereon on a horizontal axis for tilting movement, each side portion of the channel including an elongated guide slot therein having a downwardly directed notch, said slots and notches being alined, a seat carried on the channel, and a brace pivoted to the support below the first pivot and extending adjacent the sides of the channel and having one end disposed beyond said channel to provide a handle portion near one edge of the seat, said brace having a guide member slidably engaging the slots in the channel side portions, said members engaging the channel at one end of the slots to support the seat in substantially horizontal position and at the other end of the slots to support the seat in tilted position, said members on the brace respectively engaging the aforesaid notches upon slight upward movement of the seat to prevent accidental tilting of the seat, said handle portion on the brace providing means for releasing the members from the notches for permitting tilting of the seat.

DAVID B. BAKER.